United States Patent
Chandler et al.

(10) Patent No.: US 9,631,844 B2
(45) Date of Patent: Apr. 25, 2017

(54) LAYER ASSEMBLY FOR HEAT EXCHANGER

(75) Inventors: Nicholas Chandler, Maldon (GB); Richard John Harper, Chelmsford (GB)

(73) Assignee: BAE SYSTEMS plc, London (GB)

( * ) Notice: Subject to any disclaimer, the term of this patent is extended or adjusted under 35 U.S.C. 154(b) by 353 days.

(21) Appl. No.: 14/345,859

(22) PCT Filed: Sep. 14, 2012

(86) PCT No.: PCT/GB2012/052275
§ 371 (c)(1),
(2), (4) Date: Mar. 19, 2014

(87) PCT Pub. No.: WO2013/041841
PCT Pub. Date: Mar. 28, 2013

(65) Prior Publication Data
US 2014/0230455 A1    Aug. 21, 2014

(30) Foreign Application Priority Data
Sep. 21, 2011    (GB) .................................. 1116290.6

(51) Int. Cl.
*F25B 21/02*    (2006.01)
*F25B 21/04*    (2006.01)
(Continued)

(52) U.S. Cl.
CPC ............... *F25B 21/04* (2013.01); *F25B 21/02* (2013.01); *F28D 20/023* (2013.01);
(Continued)

(58) Field of Classification Search
CPC ...... F25B 21/02; F25B 21/04; F25B 2321/02; F25B 2321/023; F25B 2321/0251
(Continued)

(56) References Cited

U.S. PATENT DOCUMENTS

| | | | | |
|---|---|---|---|---|
| 3,324,667 A | * | 6/1967 | Muller | .................... F25B 21/02 136/204 |
| 5,115,859 A | | 5/1992 | Roebelen et al. | |

(Continued)

FOREIGN PATENT DOCUMENTS

| | | |
|---|---|---|
| EP | 0389407 A1 | 9/1990 |
| EP | 1331838 A2 | 1/2003 |

(Continued)

OTHER PUBLICATIONS

International Search Report and Written Opinion received for Patent Application No. PCT/GB2012/052275, mailed on Jul. 31, 2013, 9 pages.

(Continued)

*Primary Examiner* — Jianying Atkisson
*Assistant Examiner* — David Teitelbaum
(74) *Attorney, Agent, or Firm* — Finch & Maloney PLLC (57) ABSTRACT

There is disclosed herein a layer assembly for a heat exchanger, the layer assembly comprising: at least one heat pump module, the module comprising a thermo-electric cooler (TEC) attached to an island formed from a flow-permissive material; a flow-permissive layer provided with an island-reciprocating recess for substantially corresponding to and accommodating the island; a thermal storage layer comprising a heat transfer matrix material charged with a phase-change material, and provided with a TEC-reciprocating recess for substantially corresponding to and accommodating the TEC, wherein the TEC is attached to the thermal storage layer at a surface of the TEC-reciprocating recess, and the flow-permissive layer and the thermal storage layer are arranged such that the island of flow-permissive material extends into the island-reciprocating recess and a separation exists between the island and the flow-permissive layer.

20 Claims, 4 Drawing Sheets

(51) Int. Cl.
*F28F 13/00* (2006.01)
*F28D 20/02* (2006.01)

(52) U.S. Cl.
CPC ...... *F28F 13/003* (2013.01); *F25B 2321/023* (2013.01); *F28D 20/028* (2013.01); *Y02E 60/145* (2013.01); *Y10T 29/49359* (2015.01)

(58) Field of Classification Search
USPC .................................. 62/3.2, 3.5, 3.6, 3.7
See application file for complete search history.

(56) References Cited

U.S. PATENT DOCUMENTS

| | | | |
|---|---|---|---|
| 5,255,520 A | 10/1993 | O'Geary et al. | |
| 5,455,458 A | 10/1995 | Quon et al. | |
| 5,590,532 A * | 1/1997 | Bachman | B67D 1/0869 62/3.3 |
| 5,761,909 A * | 6/1998 | Hughes | F25B 21/02 165/DIG. 9 |
| 6,490,159 B1 * | 12/2002 | Goenka | H05K 1/0272 165/80.4 |
| 7,523,617 B2 * | 4/2009 | Venkatasubramanian | F25B 21/02 165/104.33 |
| 2002/0162339 A1 | 11/2002 | Harrison et al. | |
| 2005/0193742 A1 * | 9/2005 | Arnold | A41D 13/005 62/3.5 |
| 2006/0137732 A1 * | 6/2006 | Farahani | H01L 23/38 136/201 |
| 2007/0033951 A1 * | 2/2007 | Goenka | B60H 1/004 62/3.7 |
| 2009/0056914 A1 * | 3/2009 | Ruijl | F28F 13/00 165/104.19 |
| 2010/0199687 A1 * | 8/2010 | Woods | F25B 21/02 62/3.7 |
| 2010/0218512 A1 * | 9/2010 | Alahyari | F25B 21/02 62/3.3 |

FOREIGN PATENT DOCUMENTS

| | | | |
|---|---|---|---|
| EP | 1939549 A2 | 11/2007 | |
| TR | EP 1939549 A2 * | 7/2008 | .............. F25B 21/04 |
| WO | 2007024229 A1 | 3/2007 | |
| WO | 2013041841 A2 | 3/2013 | |

OTHER PUBLICATIONS

GB Intellectual Property Office Search Report under Section 17(5) received for GB Patent Application No. 1116290.6 date of search Jan. 13, 2012, 4 pages.
International Preliminary Report on Patentability received for Patent Application No. PCT/GB2012/052275, mailed on Apr. 3, 2014, 7 pages.

* cited by examiner

LAYER ASSEMBLY FOR HEAT EXCHANGER

The present invention relates to a layer assembly for a heat exchanger and further to a heat exchanger made up of such layer assemblies.

It is known to have a heat exchanger having a layer of coolant-flow permissive material, a matrix material charged with phase-change material (PCM) suitable for storing thermal energy, and a planar array of thermo-electric coolers (TECs) interposed therebetween.

The array of TECs may be used as a heat pump to control the transfer of thermal energy between a fluid passing through the coolant-flow permissive layer and the phase-change material.

As such, the heat exchanger can transfer thermal energy from the phase-change material to the air flow. Such a transfer cools the phase-change material and tends to change the phase-change material from a first state (e.g. liquid) to a second state (e.g. solid).

Further, the heat exchanger may transfer thermal energy from the air flow to the phase change material. Such a transfer cools the air and tends to change the phase-change material from the second state back to the first state.

By pre-cooling the phase-change material, e.g. by activating the TECs, the ability of the heat exchanger later to transfer thermal energy from the air flow may improve.

According to the present invention there is provided a layer assembly for a heat exchanger, the layer assembly comprising: at least one heat pump module, the module comprising a thermo-electric cooler (TEC) attached to an island formed from a flow-permissive material; a flow-permissive layer provided with an island-reciprocating recess for substantially corresponding to and accommodating the island; a thermal storage layer comprising a heat transfer matrix material charged with a phase-change material, and provided with a TEC-reciprocating recess for substantially corresponding to and accommodating the TEC, wherein the TEC is attached to the thermal storage layer at a surface of the TEC-reciprocating recess, and the flow-permissive layer and the thermal storage layer are arranged such that the island of flow-permissive material extends into the island-reciprocating recess and a separation exists between the island and the flow-permissive layer.

Thus the heat pump module is interposed between the layers so as to minimise the overall space occupied by the layer assembly. A smaller heat exchanger may be provided as compared to heat exchangers using a planar and generally continuous layer of TECs.

Further, by providing a clearance between the island and the flow-permissive layer there is a tendency to raise the tolerance for misalignments during the assembly process, thereby tending to facilitate manufacture and/or assembly of the layer assembly.

The walls and base of the recess and/or the island may be provided with crenellations, or other forms of surface relief, to encourage air to flow across the separation i.e. from the island to the flow-permissive layer and vice versa.

The TEC may be attached to the recess using a thermally conductive adhesive, such as an epoxy that has been loaded with silver, which will tend to provide a suitable bond. However, the adhesive layer should be thin (e.g. 40 microns) to provide sufficient thermal energy transfer properties.

Alternatively, a thermally conductive paste may be used to attach the TEC to the recess.

The TEC may be a micro-peltier type. A micro-peltier device has a relatively small depth, typically in the range of 0.5-0.6 mm. As such, the separation in the present invention may be suited to tolerating likely misalignments which may occur when working with such a small component.

The flow-permissive layer and the thermal storage layer may be arranged in a separated condition.

Providing such a separation can provide further tolerance during assembly and manufacture, which may thereby reduce the time or expense of the manufacture.

Nonetheless, the separation between the island and the air flow layer should not discourage air from flowing between the metal foam in the island and the metal foam (or whichever matrix form is provided) at the flow-permissive layer.

The assembly may further comprise an interstitial layer between the thermal storage layer and the flow permissive layer, where a surface of the flow-permissive layer may be attached to a first surface of a thermally insulating interstitial layer, and a surface of the thermal storage layer is attached to a second surface of the thermally insulating interstitial layer, the thermally insulating interstitial layer thereby separating the flow permissive layer and the thermal storage layer.

Such an arrangement can tend to channel the fluid into the island for heat exchange whilst tending to provide a more rigid and robust structure. The interstitial layer may be compliant so as to provide manufacturing and assembly tolerance. The interstitial layer may be formed from an adhesive.

Further, a portion of the interstitial layer may occupy a space between the heat pump module and the thermal storage layer and thereby divide the TEC-reciprocating recess from the island-reciprocating recess. Such an occupation of the space may conveniently be implemented with a single continuous interstitial layer that extends: from the region in contact with the surfaces of the thermal storage layer and the flow-permissive layer, across a gap between the island reciprocating recess and the island, and into the space between the heat pump module and the thermal storage layer.

By extending the interstitial layer into this region, the TEC is isolated/encapsulated from the flow. Thus fluid is prevented from flowing above the island and around the TEC. As such, the fluid must flow along alternative paths, such as through the island, where more thermal energy may be transferred to or from the fluid.

The flow-permissive layer may further comprise a compliant layer at the base of the recess and/or further comprise a compliant layer at the base of the flow-permissive layer for channelling the flow through the layer assembly.

The compliant layer may thereby cushion any tendency for the island to come into contact with the non-compliant components of the flow-permissive layer. Provided that the compliant layer is impermeable, the compliant layer can contribute to promoting airflow across the walls of the recess as opposed to across the base. Such a provision may thus channel fluid into the island for heat exchange.

Further, provided that the compliant layer has a relatively high thermal conductivity it may contribute to heat dissipation.

The compliant layer may be formed from any suitably resilient material with sufficient thermal conductivity and corrosion resistance.

In general the flow-permissive layer, thermal storage matrix and/or the island may be formed from metal foam.

The provision of a metal foam at the flow-permissive layer tends to provide a component that is generally lightweight (and hence suitable for use on airborne platforms), that can provide structural rigidity (thereby simplifying design) and that promotes turbulent flow (which tends to promote effective thermal energy transfer).

In particular the metal foam may be an open-cell aluminium foam.

Such a foam is particularly suited to providing a lightweight component, having a relatively high strength to weight ratio. Further, the aluminium foam has a suitably high thermal conductivity and tends to promote turbulent flow in fluids travelling through it.

The flow-permissive layer may comprise fins.

Fins, such as pin fins or lanced foil-fins, may be used in addition to, or as an alternative to, the metal foam in order to effect heat transfer and promote turbulent fluid flow. Fins may be used on the internal or external aspects of the layer where the structural integrity/rigidity of the layer may be provided by another component. The fins may be of the foil-fin type or may be pin-fins.

Typically the thermal storage layer is provided with a substantially encapsulating skin.

The skin acts to retain the PCM within the matrix of the thermal storage layer. In certain conditions some of the PCM might otherwise tend to leak out, from the matrix (for example a wax-based PCM could melt or water in a salt-based PCM could dissociate).

Furthermore where a rigid skin is provided the skin can extend from the flow-permissive layer to the thermal layer so as to rigidly couple these components at a desirable separation. Sheet aluminium may be suitable as such a rigid skin, particularly where the PCM is wax-based.

Where the PCM is salt-based, a stainless steel skin will tend to mitigate the risk of corrosion.

The heat pump module may comprise a thermal interface layer between the TEC and the island.

Such a thermal interface layer, which is typically a sheet of metal, provides a surface upon which the TEC may more readily be mounted. Further, where the sheet has a greater area than the TEC, the sheet will also act to spread the heat, hence more effectively to transfer heat to or from the island and the air flowing there-through.

The PCM may comprise a salt-based phase change material and/or a wax-based phase change material.

The applicant has determined that whilst in comparison to a wax-type PCM a salt type PCM (e.g. an anhydrous (hydrated) salt) may offer equivalent thermal capacity capability at a reduced volume, the wax-type PCM may tend to have a longer service life.

The assembly may be provided with a pair of impermeable barriers arranged on either side of the heat pump module to substantially channel fluid through the island.

The provision of such barriers will prevent fluid flowing around the island and thus passing through the recess without effectively transferring thermal energy to or from the thermal storage layer.

In order to preserve the function of the assembly, such barriers would typically be formed from a thermally conducting compliant material at the level of the island, but thermally insulating material if at the level of the TEC.

The assembly may be provided with a plurality of heat transfer modules and a plurality of corresponding island-reciprocating recesses and TEC-reciprocating recesses, each heat transfer module being fixed to a respective TEC-reciprocating recess and extending into a respective island-reciprocating recess. In such a form, the plurality of heat transfer modules may be arranged in a regular periodic configuration, thereby forming an array.

According to a second aspect of the invention there is provided a heat exchanger comprising a plurality of layer assemblies according to the first aspect of the invention.

According to a third aspect of the invention there is provided a method of manufacturing an assembly according to the first aspect of the invention comprising the steps of:—i) forming the thermal storage layer; ii) forming the heat pump modules; iii) forming the air-flow layer; iv) fixing the heat pump modules to the thermal storage layer; and v) fixing the thermal storage layer to the air-flow layer.

As such there is provided a method of constructing a heat exchanger where the air gap between the components tolerates some misalignments between construction rigs and other equipment. Thus the heat exchanger assembly may tend to be produced faster and/or at a lower cost.

So that the invention may be well understood, at least one embodiment shall be described as an example and with reference to the following figures of which.

Figure 1:
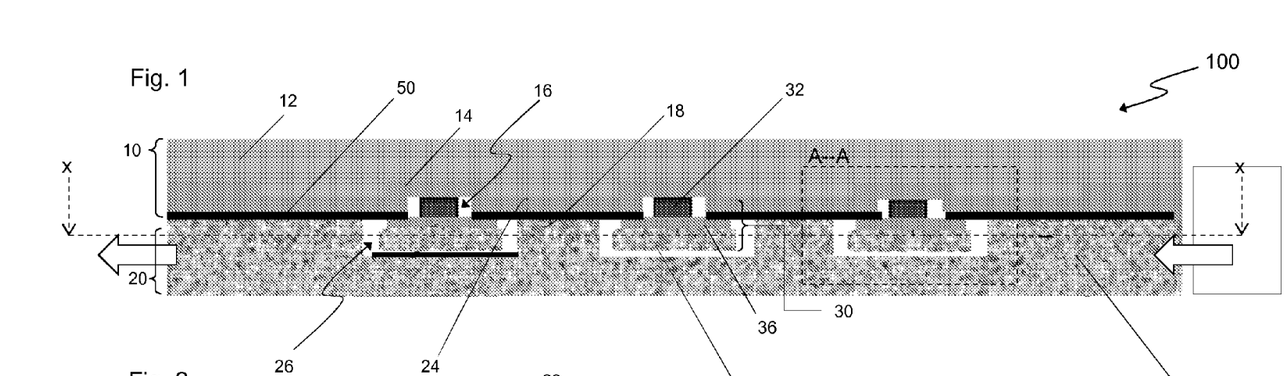
FIG. 1 shows a cross section of a layer assembly according to the invention.

The layer assembly 100 as shown in FIG. 1 has a first, thermal storage, layer 10 mounted upon but generally spaced apart from a second, flow-permissive, layer 20. Interposed between these layers is a plurality of heat pump modules 30.

The first layer 10 is substantially formed from a block 12 of aluminium open-cell foam which is charged with a phase change material. In this embodiment the phase change material is paraffin wax.

The block 12 is substantially encapsulated by a thin (approx. 0.5 mm) skin 14 of aluminium so as to retain the phase change material within the open-cell foam.

Recesses 16 are provided in the first layer 10 which extend upward into the first layer 10 from a lower surface 18. Each recess 16 corresponds to a heat pump module 30.

The second layer 20 is formed from a block 22 of open-cell aluminium foam. The block 22 is provided with recesses 26 extending into the block from an upper surface 24. Each recess 26 corresponds to a heat pump module 30.

Each heat pump module 30 comprises a thermoelectric cooler (TEC) 32, such as a Peltier cooler, mounted on an interface layer 36 formed from a thin sheet of aluminium, mounted on an island 34 formed from open-cell aluminium foam. Each island is generally cylindrical to facilitate alignment tolerance.

The electrical connections (not shown) of the TECs extend to the outside of the assembly for integration with a suitable control system, the implementation of which would be within the ambit of the skilled man.

Each heat pump module 30 is attached by its TEC to a respective first layer recess 16. The attachment may be made using a thin conductive epoxy bond.

Figure 2:
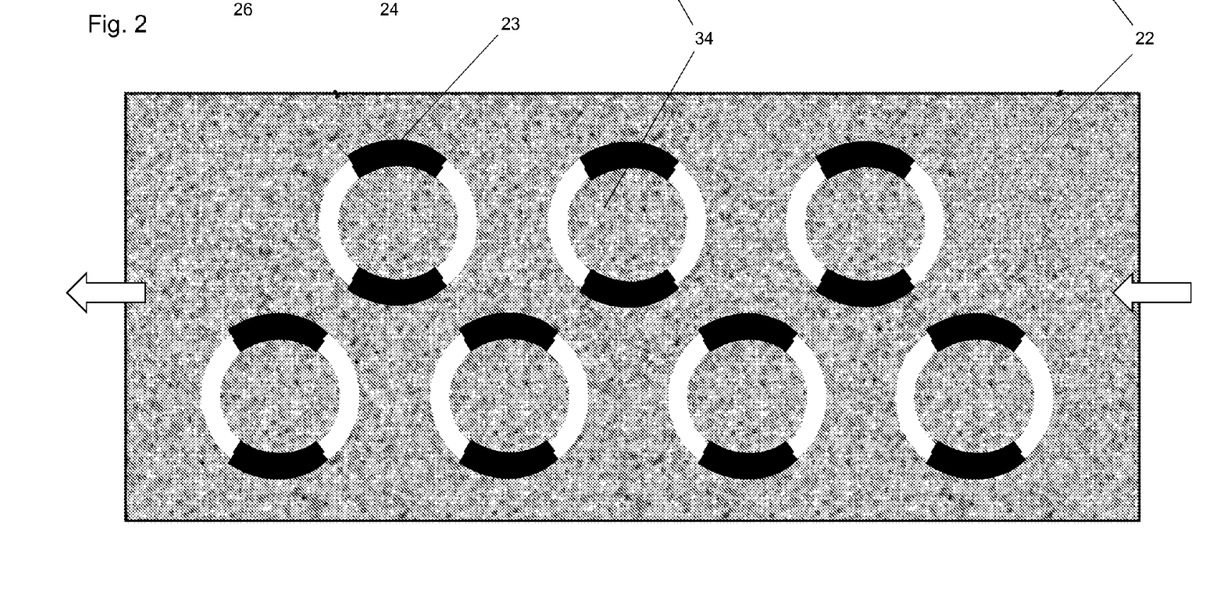
FIG. 2 shows the layer assembly of FIG. 1 as viewed through cross-section X-X.

Each TEC extends from the first layer 10 towards the second layer 20 such that the island 34 occupies a respective second layer recess 26. It can be seen from the figures that the islands 34 are generally cylindrical and thus the first layer recesses 26 define a cavity of generally cylindrical form and of greater depth and radius than the island 34.

The lower surfaces 18 of the thermal storage layer 10 and the upper surfaces of the flow-permissive layer 20 are attached to opposing sides of an interstitial layer 50. The interstitial layer 50 extends across the recess 26 in the flow permissive layer and contacts the heat pump module 30 around the base of the TEC 32 such that the layer 50 occludes the space S in the region between the thermal storage layer 10 and the heat pump module 30.

Thus the interstitial layer 50 not only holds the thermal storage layer 10 and the flow permissive layer 20 at a separation but also, because the interstitial layer 50 is generally impermeable, tends to isolate the TEC 32 to prevent fluid directly contacting it.

The interstitial layer 50 is formed from a thermally insulating material which also has sufficient compliance/resilience to increase tolerance in manufacture and to enable the heat exchanger to better absorb shock in operation.

The dimensions of the recesses 16, 26, the heat pump modules 30 and the separation S between the first and second layers are such that an air gap G exists around each heat pump module. In some embodiments this air gap G may be partially filled with a pair of side barriers 23 for channelling fluid through the island 34. Further embodiments may provide a compliant layer 28, 29 at the base of the airgap for the same purpose of channelling fluid through the island 34.

Figure 3:
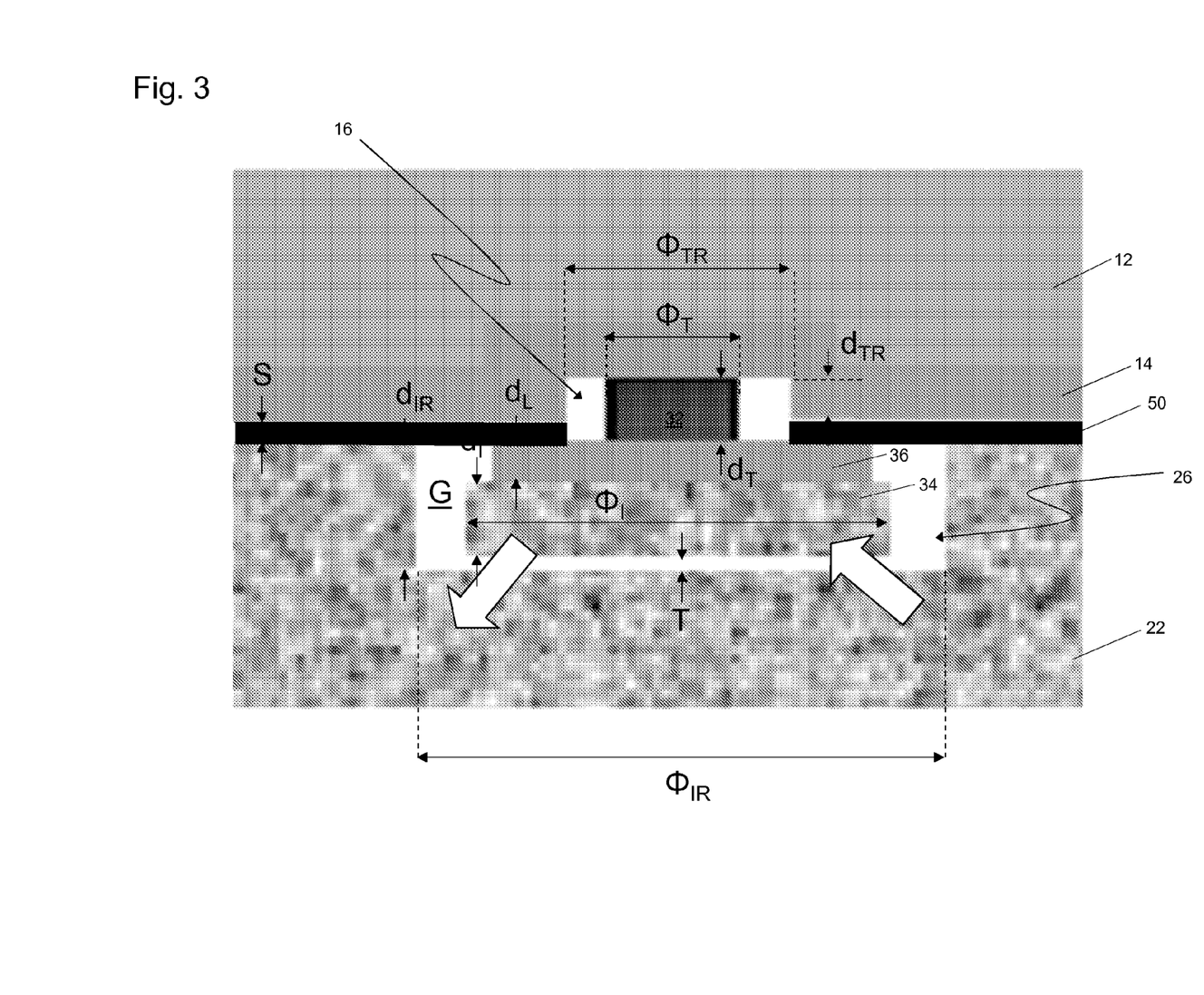
FIG. 3 shows a close up view of portion A-A of FIG. 1.

As may be seen from FIG. 3, the diameter $\phi_{IR}$ of the island-reciprocating recess 26 is greater than the diameter $\phi_I$ of the island 34. Further, the depth $d_{IR}$ of the island-reciprocating recess 26 is T greater than the combined depth $d_I$ of the island 34 and $d_L$ the interface layer 36. Still further, the dimension $\phi_{TR}$ of the TEC-reciprocating recess 16, is greater than the dimension $\phi_T$ of the TEC 32. The depth $d_T$ of the TEC is approximately equal to the combined depth of the TEC-reciprocating recess $d_{TR}$ and the separation S.

The gaps between the first layer and second layer and the air gaps surrounding the heat pump module provide an increased tolerance in the manufacturing of the assembly.

Figure 4:
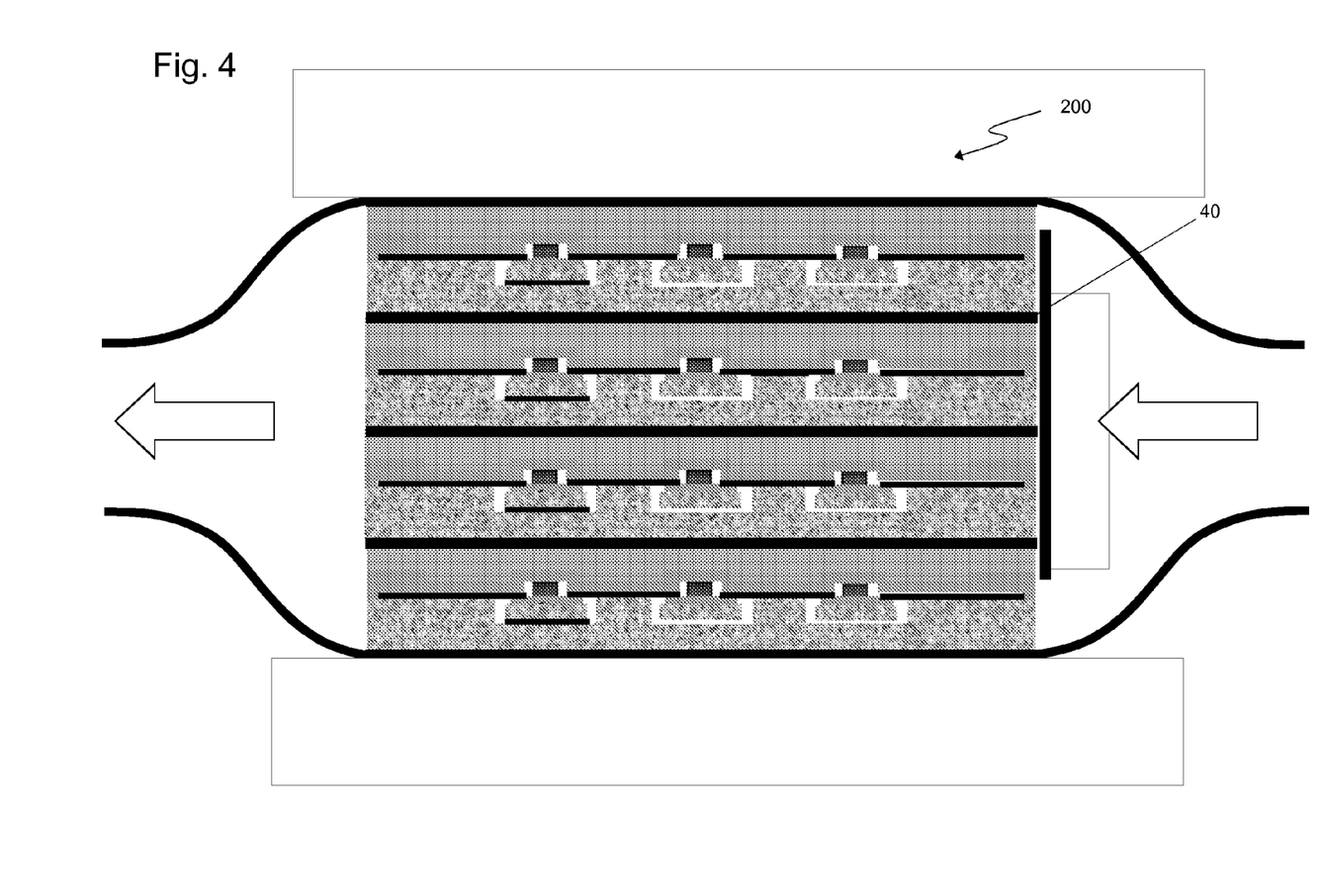
FIG. 4 shows a heat exchanger made up of a plurality of layer assemblies as shown in FIG. 1.

As shown in FIG. 4, a plurality of the assembly layers as shown in FIG. 1 may be stacked upon each other, with suitable interface layers 40 therebetween to provide a heat exchanger 200.

In general operation, air flows into the second layer 20 on one side (the right side as shown in the figures), flows through the open-cell foam therein, flows across the airgap G and into the open-cell foam of the island 34, flows out of the island across the opposite portion of the air gap G back into the second layer 20, and finally flows out of the second layer 20 at the other side (the left side as shown in the figures).

Depending on the state of the phase change material and the activation of the TECs, the air may tend to have thermal energy transferred to it, or from it.

For example, if the layer assembly is provided in a heat exchanger for an aircraft, then before taxiing to the runway the PCM may be pre-cooled (i.e. cooled to below ambient temperature so as to solidify) by activating the TECs to transfer thermal energy from the PCM to the air-flow. In order to further facilitate this transfer, measures may be taken to cool the air-flow (e.g. using an external cooling apparatus).

Hence, when the aircraft is taxiing to a take off position (which will typically be the maximum operational temperature for the aircraft), the PCM in the heat storage layer may extract heat from the air flowing through the flow-permissive layer as it tends to change phase (i.e. melt). As such, the air output from the exchanger may be used to cool temperature-regulated parts of the aircraft such as the avionics bay.

Once airborne and cruising, the ambient temperature can be low enough, without or in combination with the TECs, to cool the PCM so as to return it to its solid phase.

Figure 5:
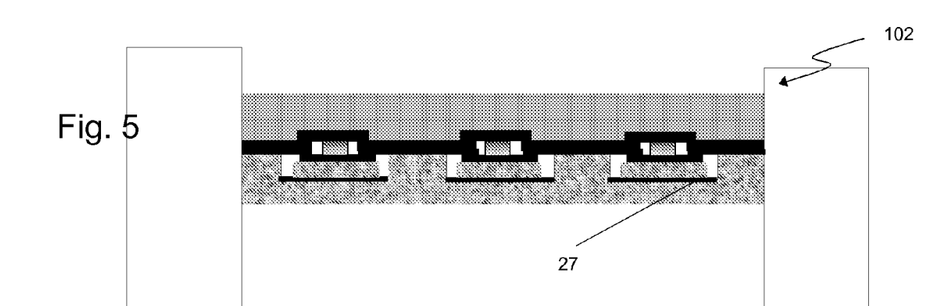
FIG. 5 shows a cross section of a second embodiment of a layer assembly according to the invention.

A second embodiment 102 of the layer assembly, as shown in FIG. 5, is distinct from the first embodiment 100 in that it is provided with a compliant layer 27 at the bottom of each flow-permissive layer recess 26. The compliant layer 27 is chosen to have suitable thermal conductivity. Further the compliant layer 27 should be generally impermeable to fluid and should not tend to deteriorate at the likely operating temperatures.

In general, the second embodiment operates in the manner of the first. However the provision of the compliant layer 27 can further assist with assembly tolerance without adversely affecting the thermal properties of the layer assembly. Further the provision of the compliant layer 27, which will be generally impermeable, and the interstitial layer 50 between the PCM layer 10 and the flow-permissive layer 20 will tend to promote air-flow into and out of the island through the recess walls (i.e. the surfaces of the recesses shown vertically in the figures).

Figure 6:
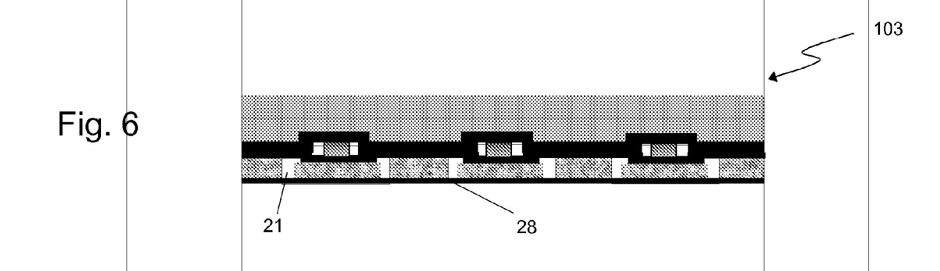
FIG. 6 shows a cross section of a third embodiment of a layer assembly according to the invention.

A third embodiment 103 of the layer assembly, as shown in FIG. 6, is provided with recesses 26 formed in the flow-permissive layer 20. However in the third embodiment the block 22 of foam is provided with through-holes 21 and a single compliant layer 28 is applied to the lower surface of the foam block 22. This continuous compliant layer 28 provides an impermeable and insulating base to the flow-permissive layer. Thus the recesses 26 are formed from the combination of the walls of the through holes in block 22 and the compliant base 28.

Figure 7:
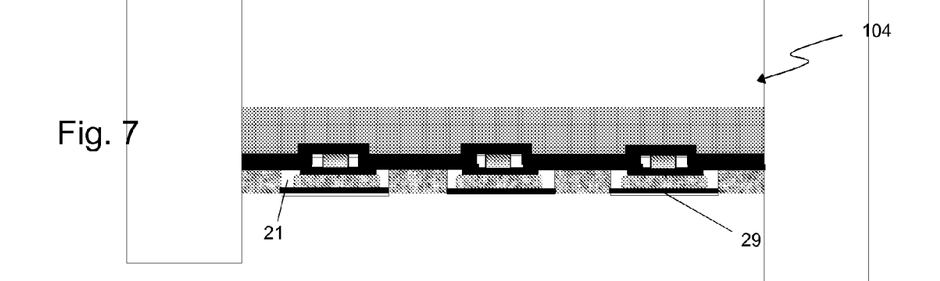
FIG. 7 shows a cross section of a fourth embodiment of a layer assembly according to the invention.

A fourth embodiment 104 of the layer assembly, shown in FIG. 7, provides a block 22 at the flow-permissive layer which is provided with through holes 21 as in the third embodiment. However in the fourth embodiment, distinct compliant layers 29 are provided at the base of the flow-permissive layer. Each compliant layer 29 covers the through hole 21 of a particular heat module 30 and thereby acts as the base of the recess 26.

The third and fourth embodiments operate much as the second embodiment insofar as the compliant layers mitigate mechanical damage which may occur as a result of stacking layer assemblies, and insofar as the impermeable compliant layer tends to channel the fluid towards the islands.

The first embodiment of the layer assembly 100 could be fabricated, but for a PCM filling step, by the following steps i) to v):— i) Manufacture of the aluminium foam for the air-flow permissive layer and the thermal storage layer by salt-bath brazing, and formation of any recesses (e.g. by machining or pressing).

ii) If, salt-based PCM to be used, application of a protective process for the foam.

iii) Fitting, for example by welding, of the skin to the PCM storing layer (fitting could be by welding or salt-bath brazing).

iv) Fine-finish machining of the thermal interfaces (i.e. the areas of the skin to which the TECs will be attached).

v) Attachment of the TECs by first-bond stage to the thermal storage layer to create the general assembly layer structure, into which the liquid PCM may be added.

Upon assembly of such a structure, a complete heat exchanger could be effected by stacking a plurality of the assembly layers, sealing against moisture, filling of the thermal storage layers with liquid-phase PCM (leaving a PCM expansion space), and hermetically sealing the PCM enclosures.

The exact sequence of these steps need not necessarily be adhered to, indeed the skilled man would recognise different sequences of the steps which could alternatively be performed to arrive at a layer assembly as described herein.

In the above described embodiments, the matrices have been described as being open-cell aluminium foams; however the matrix need not be open-cell aluminium, but could be any open-cell metal foam. Further the matrix material need not be an open-cell foam but could be fin type.

As an alternative to using a wax-type phase change material a salt-type phase-change material could be used. Such a phase-change material can provide equivalent thermal transfer properties as a wax but with a lesser volume. However such salts tend to be corrosive and as such provisions should be taken to mitigate corrosion.

The shape of the island and its corresponding cavity need not be cylindrical. Indeed the shape could be cuboid, or an extrusion of a triangle or any polygon. Further the island and cavity could have surface relief or ornamentation e.g. crenellations, saw-tooth edges, pyramidal projections, etc to promote turbulence and hence flow of air between the air flow permissive layer and the islands.

In further embodiments the island may extend across the breadth of the assembly such that air flowing through the top part of the flow-permissive layer must pass through the island. Alternatively, barriers 23 may be provided at strategic points within the airgap G for the same purpose. Should barriers 23 be provided, they may be formed from a compliant material, which could be thermally conducting and/or thermally insulating as appropriate.

The material forming the compliant layer 27, 28 or 29 may be selected according to the particular requirements of the heat exchanger. For example, the compliant layer may need to have a depth sufficient to fill a gap (e.g. gap T as shown in FIG. 3); or may need to be resistant to deterioration in the presence of a certain corrosive fluid or salt; or may need to be tolerant (e.g. remain in its solid phase) to a particularly high operational temperature or range; or may need to be easily inserted and removed to allow servicing.

The selection of the compliant layer material could be within the ambit of the skilled man; however at least the following materials and types of materials are contemplated by the applicant for use in the compliant layer: adhesives, rubbers, polymers, or soft metals (e.g. indium). Where substantially non-metallic compliant layers are used (such as a polymer-based compliant layer) thermal conductivity may be enhanced by dispersing better conductors (such as metallic particles, diamond particles, carbon particles or carbon nanotubes) throughout the layer.

Where the compliant layer or interstitial layer is applied as a fluid and allowed to set for use in operation, there may be ingress of the fluid into adjacent metal foam structures, in which case the overall thermal conductivity of the compliant layer may tend to increase. Such ingress may also occur to some extent where the compliant layer or interstitial layer is applied as a solid.

The TECs used in the embodiments may be of the conventional type such as the ET-032-14-15-RH-RS as branded by Global Component Sourcing (contact Global Component Sourcing, 3705 Bank of America Tower, Suite 338, 12 Harcourt Road, Central, Hong Kong) and distributed by RadioSpares (see http://uk.rs-online.com/web/).

Alternatively a micro-Peltier device may be used such as the sTEC™ HV56 Thermoelectric Cooler (part number NCA-1004850-304A) as produced by Nextreme thermal solutions (contact info@nextreme.com, or Nextreme Thermal Solutions, Inc., 3908 Patriot Dr., Suite 140, Durham, N.C. 27703-8031, USA).

The invention claimed is:

1. A layer assembly for a heat exchanger, the layer assembly comprising:
   at least one heat pump module comprising a thermoelectric cooler (TEC) attached to an island formed from a flow-permissive material, the flow-permissive material configured to permit a fluid to flow therethrough;
   a flow-permissive layer provided with an island-reciprocating recess for substantially corresponding to and accommodating the island; and
   a thermal storage layer comprising a heat transfer matrix material and provided with a TEC-reciprocating recess for substantially corresponding to and accommodating the TEC, the heat transfer matrix material being charged with a phase-change material;
   wherein the TEC is attached to the thermal storage layer at a surface of the TEC-reciprocating recess, and the flow-permissive layer and the thermal storage layer are arranged such that the island of flow-permissive material extends into the island-reciprocating recess and a separation exists between the island and the flow-permissive layer.

2. The layer assembly according to claim 1 wherein the flow-permissive layer and the thermal storage layer are arranged in a separated condition.

3. The layer assembly according to claim 1 further comprising a thermally insulating interstitial layer between the thermal storage layer and the flow permissive layer, wherein a surface of the flow-permissive layer is attached to a first surface of the thermally insulating interstitial layer, and a surface of the thermal storage layer is attached to a second surface of the thermally insulating interstitial layer, the thermally insulating interstitial layer thereby separating the flow permissive layer and the thermal storage layer.

4. The layer assembly according to claim 1 further comprising an interstitial layer between the thermal storage layer and the at least one heat pump module.

5. The layer assembly according to claim 1 wherein the flow-permissive layer further comprises a compliant layer at the base of the recess.

6. The layer assembly according to claim 1 wherein the flow-permissive layer further comprises a compliant layer at the base of the flow-permissive layer for channelling the flow through the layer assembly.

7. The layer assembly according to claim 1 wherein the flow-permissive layer, thermal storage layer and/or the island are formed from metal foam.

8. The layer assembly according to claim 1 wherein the flow-permissive layer, thermal storage layer and/or the island are formed from an open-cell aluminium foam.

9. The layer assembly according to claim 1 wherein the flow-permissive layer comprises fins.

10. The layer assembly according to claim 1 wherein the thermal storage layer is provided with a substantially encapsulating skin.

11. The layer assembly according to claim 1 wherein the at least one heat pump module comprises a thermal interface layer between the TEC and the island.

12. The layer assembly according to claim 1 wherein the phase-change material comprises a salt-based phase change material.

13. The layer assembly according to claim 1 wherein the phase-change material comprises a wax-based phase change material.

14. The layer assembly according to claim 1 further provided with a pair of impermeable barriers arranged on either side of the at least one heat pump module to substantially channel fluid through the island.

15. The layer assembly according to claim 1 wherein the assembly is provided with a plurality of heat pump modules and a plurality of corresponding island-reciprocating recesses and TEC-reciprocating recesses, each heat pump module being fixed to a respective TEC-reciprocating recess and extending into a respective island-reciprocating recess.

16. The layer assembly according to claim 1 wherein the assembly is provided with a plurality of heat pump modules and a plurality of corresponding island-reciprocating recesses and TEC-reciprocating recesses, each heat pump module being fixed to a respective TEC-reciprocating recess and extending into a respective island-reciprocating recess, and wherein the plurality of heat pump modules are arranged in a regular periodic configuration, thereby forming an array.

17. A heat exchanger comprising a plurality of layer assemblies, each layer assembly comprising:
  at least one heat pump module comprising a thermo-electric cooler (TEC) attached to an island formed from a flow-permissive material, the flow-permissive material configured to permit a fluid to flow therethrough;
  a flow-permissive layer provided with an island-reciprocating recess for substantially corresponding to and accommodating the island; and
  a thermal storage layer comprising a heat transfer matrix material and provided with a TEC-reciprocating recess for substantially corresponding to and accommodating the TEC, the heat transfer matrix material being charged with a phase-change material;
  wherein the TEC is attached to the thermal storage layer at a surface of the TEC-reciprocating recess, and the flow-permissive layer and the thermal storage layer are arranged such that the island of flow-permissive material extends into the island-reciprocating recess and a separation exists between the island and the flow-permissive layer.

18. A method of manufacturing an assembly, the method comprising:
  forming a thermal storage layer, the thermal storage layer comprising a heat transfer matrix material and provided with a TEC-reciprocating recess for substantially corresponding to and accommodating a thermo-electric cooler (TEC), the heat transfer matrix material being charged with a phase-change material, wherein the TEC is attached to the thermal storage layer at a surface of the TEC-reciprocating recess;
  forming a heat pump module, the heat pump module comprising the TEC attached to an island formed from a flow-permissive material, the flow-permissive material configured to permit a fluid to flow therethrough;
  forming an air-flow layer, the air-flow layer provided with an island-reciprocating recess for substantially corresponding to and accommodating the island;
  fixing the heat pump module to the thermal storage layer; and
  fixing the thermal storage layer to the air-flow permissive layer;
  wherein the air-flow layer and the thermal storage layer are arranged such that the island of flow-permissive material extends into the island-reciprocating recess and a separation exists between the island and the air-flow layer.

19. The method according to claim 18 wherein the assembly is provided with a plurality of heat pump modules and a plurality of corresponding island-reciprocating recesses and TEC-reciprocating recesses.

20. The method according to claim 18 wherein the assembly is provided with a plurality of heat pump modules and a plurality of corresponding island-reciprocating recesses and TEC-reciprocating recesses, and wherein the plurality of heat pump modules are arranged in a regular periodic configuration, thereby forming an array.

* * * * *